United States Patent [19]
Yamauchi

[11] Patent Number: 5,603,149
[45] Date of Patent: Feb. 18, 1997

[54] TABLE REPLACEMENT APPARATUS IN A NUMERICAL CONTROL ROUTER

[75] Inventor: Yoshiyuki Yamauchi, Shizuoka-Ken, Japan

[73] Assignee: Heian Corporation, Shizuoka-ken, Japan

[21] Appl. No.: 339,767

[22] Filed: Nov. 15, 1994

[30] Foreign Application Priority Data

May 14, 1994 [JP] Japan .................................. 6-124512

[51] Int. Cl.⁶ .............................. B23Q 7/00; B65G 37/00
[52] U.S. Cl. ................. 29/33 P; 198/345.3; 198/346.1; 409/165; 409/227
[58] Field of Search ..................... 29/33 P, 564, 29/563; 198/346.1, 345.3, 833; 414/749; 409/145, 163, 158, 159, 219, 227

[56] References Cited

U.S. PATENT DOCUMENTS

| | | |
|---|---|---|
| 4,458,808 | 7/1984 | Loomer ............................... 414/749 X |
| 4,715,490 | 12/1987 | Date et al. ........................... 198/346.1 |
| 4,917,233 | 4/1990 | Tsuda et al. ............................ 198/833 |
| 4,987,668 | 1/1991 | Roesch ................................ 409/165 X |
| 4,997,078 | 3/1991 | Itoh .................................. 198/465.1 X |
| 5,054,175 | 10/1991 | Date .................................... 29/33 P |
| 5,062,190 | 11/1991 | Kitamura .............................. 29/33 P |
| 5,241,732 | 9/1993 | Tseng .................................. 29/563 X |
| 5,301,788 | 4/1994 | Hironaka et al. .................... 198/345.3 |
| 5,429,461 | 7/1995 | Mukherjee et al. .................... 409/163 |

FOREIGN PATENT DOCUMENTS 173938 11/1982 Japan .................................. 29/33 P

*Primary Examiner*—William Briggs
*Attorney, Agent, or Firm*—Burgess, Ryan and Wayne

[57] ABSTRACT

Apparatus and method for operating a numerical control router in which two processing tables are employed such that when a process board on one table is being processed, another process board may be loaded on to the second table and when processing is complete the first and second tables exchange positions.

3 Claims, 6 Drawing Sheets

TABLE REPLACEMENT APPARATUS IN A NUMERICAL CONTROL ROUTER

FIELD OF THE INVENTION

The present invention relates to a table replacement apparatus in a numerical control router in which two tables replace each other.

BACKGROUND OF THE INVENTION

In prior numerical control routers, one or more head constitution bodies are mounted to move by a rail attached to a base. One table is mounted to move by two rails attached to the base at right angles to the above-mentioned single rail. A process board is positioned on the table and is processed by the numerical control router. When the processing of the process board terminates, the process board is removed from the table and the next process board is positioned on the table. The same process is repeated on the next process board.

In such numerical control routers, the process board is removed from and positioned on the table every time the process of a process board terminates. Therefore, the time needed to remove one board and position a new board on the table is wasteful and the overall time for processing a process board becomes very time consuming.

SUMMARY OF THE INVENTION

It is, therefore, the primary object of the present invention to provide a table replacement apparatus in a numerical control router in which two tables are used to treat process boards whereby the time needed to position and remove the process boards is reduced.

It is another object of the present invention to provide a table replacement apparatus in a numerical control router in which, during processing of a first process board on a first table, the next process board is positioned on a second table.

In order to accomplish the above and other objects, the present invention comprises at least one structure having a main motor with a rotary shaft for fixing a tool of a drill or cutter, the at least one head structure being moved on head rails attached to a side of a rail member which is provided with an upper part of a bed, a first table movably mounted on table frames, two table supporting members movably supported by respective insides of the table frames, a second table supported on the sides of the table supporting members and adapted to be raised and lowered, chains respectively connected to the ends of the first and second tables, chain supporting gears for supporting the chains which are provided with the ends of the table frames, table moving means for moving the first and second tables in opposite directions, and cylinders for raising and lowering the second table whereby the second table is movable into the original position of the first table when processing of a process board on the first table has been completed.

DESCRIPTION OF THE PREFERRED EMBODIMENTS

Figure 1:
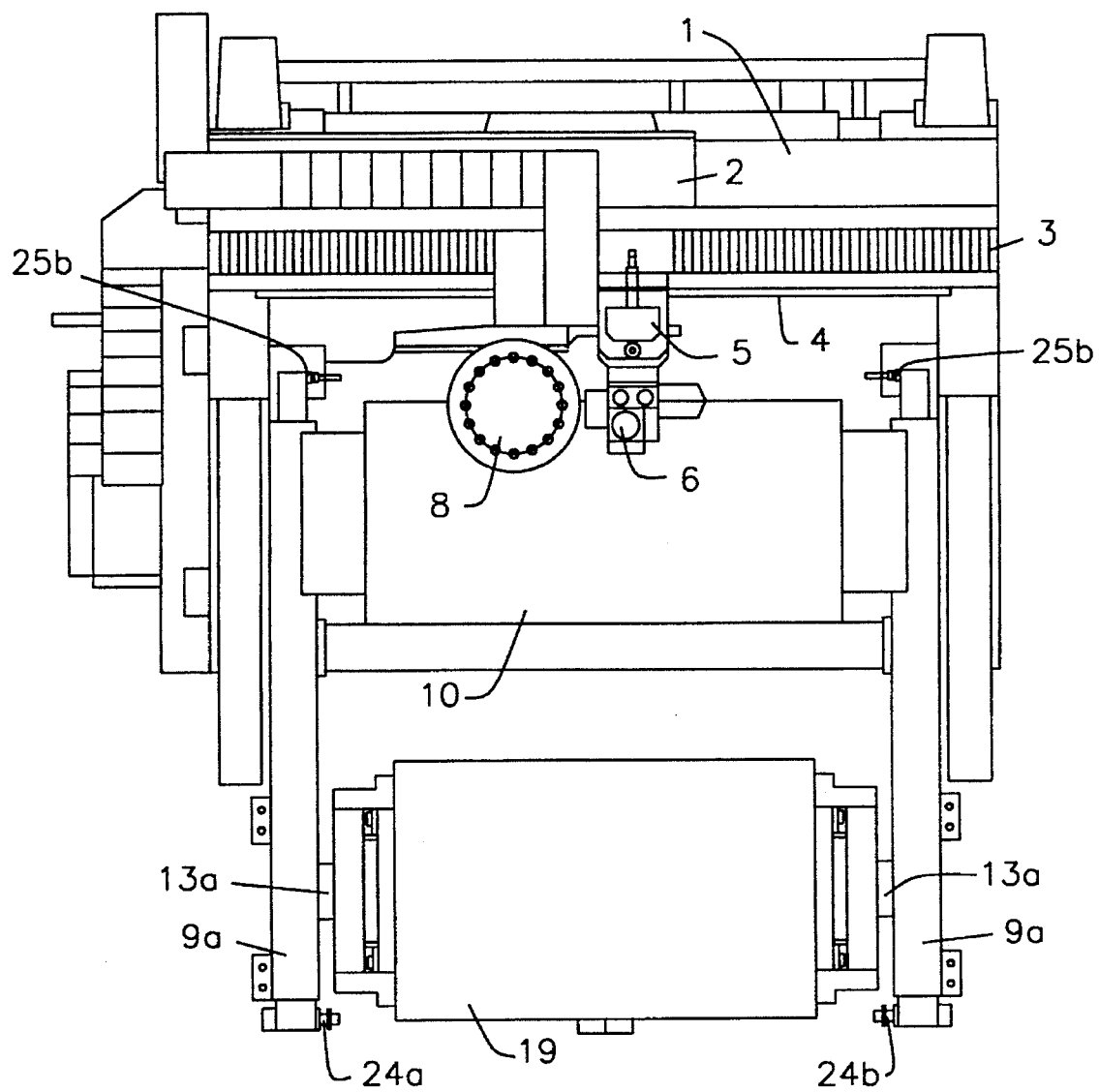
FIG. 1 shows a plan view of a table replacement apparatus in a numerical control router according to the present invention.
Figure 2:
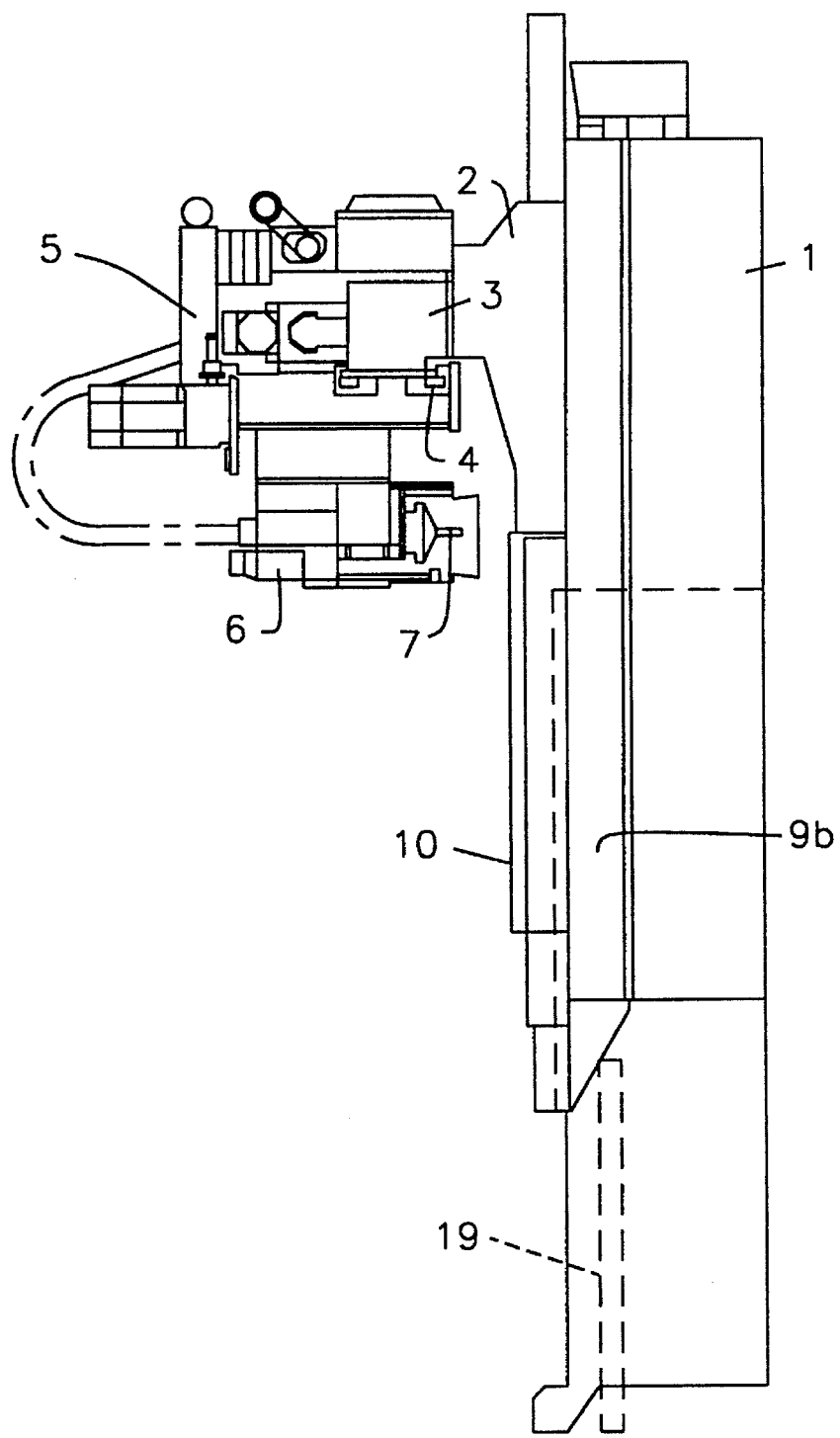
FIG. 2 shows a side view of the table replacement apparatus in a numerical control router shown in FIG. 1.
Figure 3:
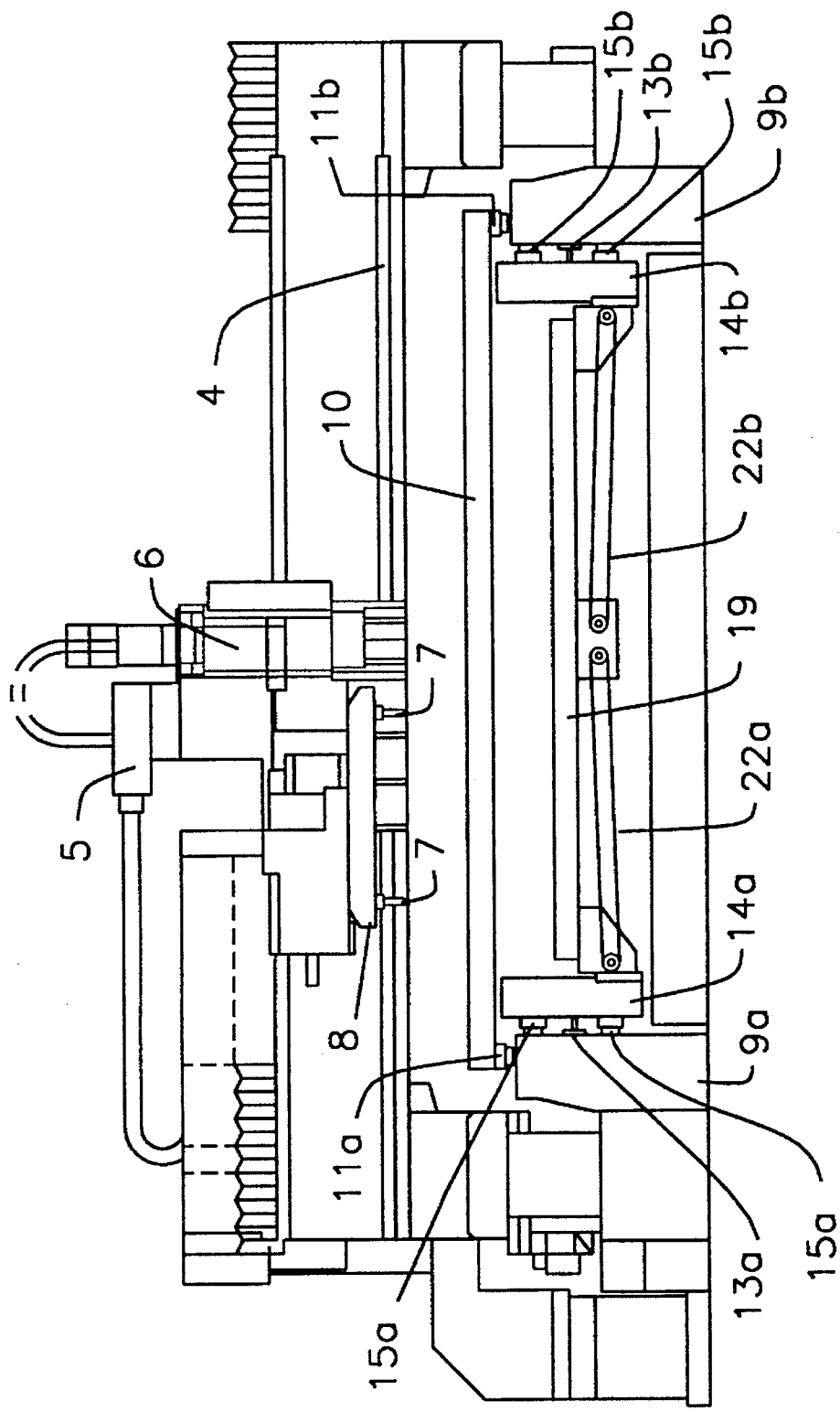
FIG. 3 shows a side view of the table replacement apparatus in a numerical control router shown in FIG. 1.
Figure 4:
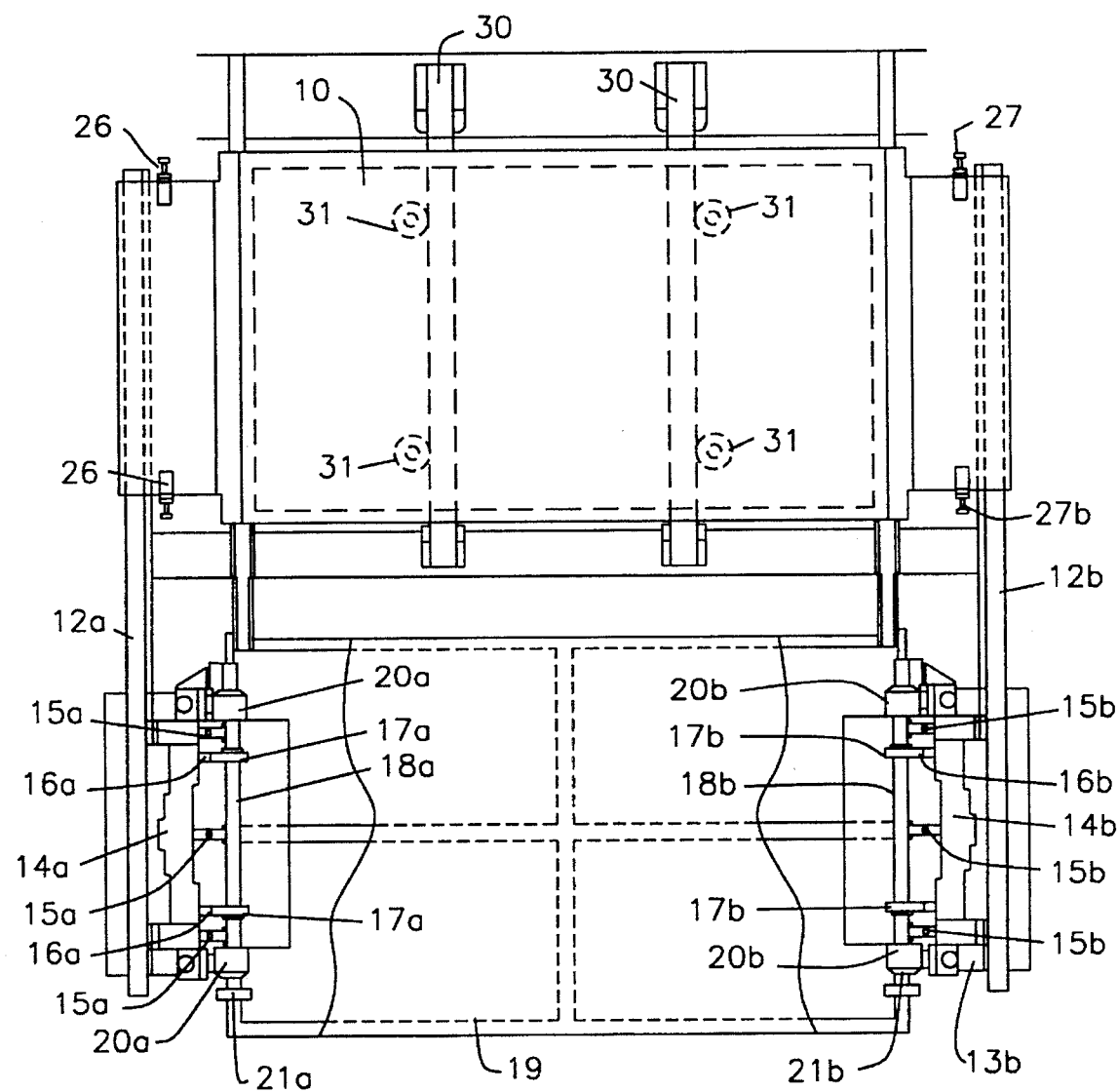
FIG. 4 shows a plan view of the first and second tables of the device shown in FIG. 1.
Figure 5:
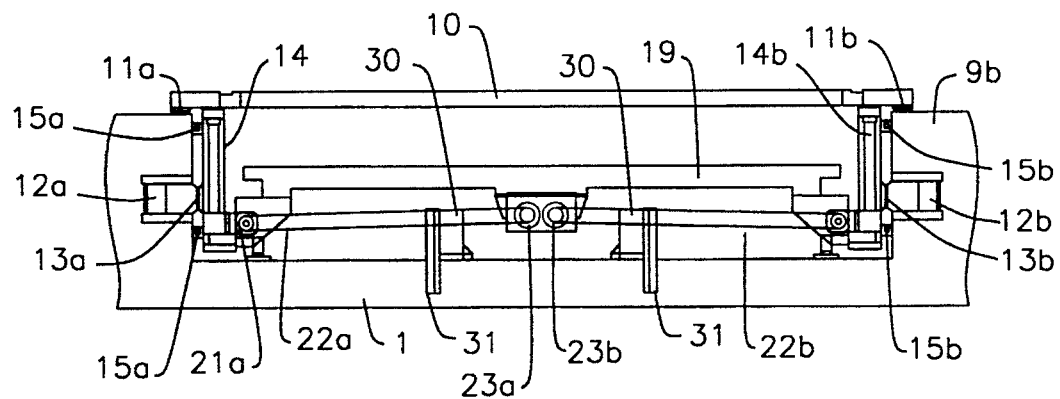
FIG. 5 shows a front view of the first and second tables of the device shown in FIG. 1.

The numerical control router shown in FIGS. 1, 2, 3, 4, 5 and 6, includes a supporting constitution 2 fixed to a bed 1, a rail member 3 fixed to an upper portion of the supporting construction 2 and head rails 4 attached to the side of the rail member 3. A head structure 5 is mounted on the rail member 3 to move on the head rails 4. A tool 7 such as a drill or a cutter is attached to a main motor 6 and a tool changing device 8 housing a plurality of tools 7 is provided with the head structure 5 near the main motor 6.

Table frames 9a and 9b are provided on both sides of the bed 1 and a first table 10 is mounted to move on table rails attached to the upper portion of the table frames 9a and 9b by rollers 11a and 11b. Also, cylinders 12a and 12b are provided on middle portions of the table frames 9a and 9b, respectively. Table supporting members 14a and 14b are connected to driving members 13a and 13b of the cylinders 12a and 12b and are movable on rollers 15a and 15b.

Racks 16a and 16b (See FIG. 4) are perpendicularly attached to the table supporting members 14a and 14b, gears 17a and 17b are fixed to rotary shafts 18a and 18b which are rotatably supported by bearings 20a and 20b attached to the both sides of a second table 19. Gears 21a and 21b are fixed to the ends of the rotary shafts 18a and 18b; gears 23a and 23b are attached below the second table 19 and are engaged to each other, and chains 22a and 22b are suspended between the gears 21a and 23a and 21b and 23b, respectively.

Figure 6:
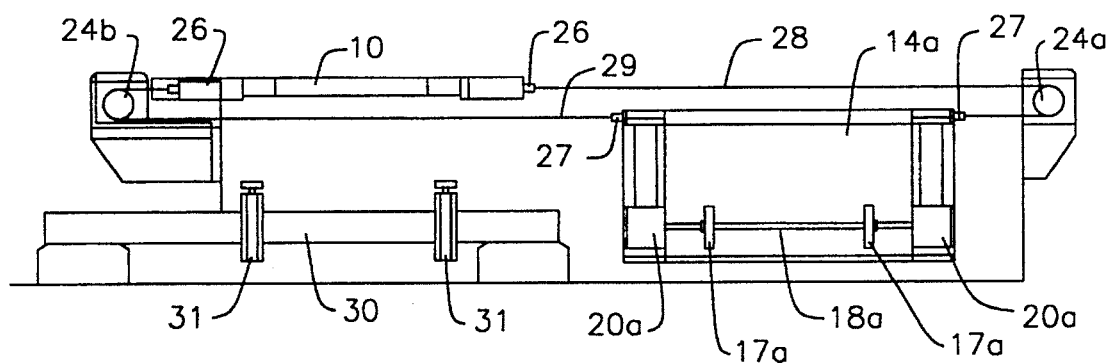
FIG. 6 shows a side-sectional view of the first and second tables of the device shown in FIG. 1.

As shown in FIGS. 1 and 6, chain supporting gears 24a and 25a and 24b and 25b are attached to the both ends of the table frames 9a and 9b, respectively. The ends of chains 28 and 29 are fixed to chain fixing members 26 and 27, respectively. Both ends of the first and second tables 10 and 19 are respectively suspended by the chain supporting gears 24a and 25a and 24b and 25b. Cylinder frames 30 are fixed below the first table 10 and cylinders 31 for raising and lowering the second table 19 are fixed to the cylinder frames 30.

In the table replacement apparatus, in accordance with the present invention, when the driving members 13a and 13b are driven by the cylinders 12a and 12b, the first and second tables 10 and 19, respectively are moved in opposite directions by the drawing the chains 28 and 29. When the second table 19 is moved to the position of the first table 10, the second table 19 can be raised to the height of the first table 10 by the cylinders 31.

When the second table 19 is raised, the gears 17a and 17b are respectively engaged to the racks 16a and 16b which are respectively fixed to the table supporting members 14a and 14b and are rotated with the rotary shafts 18a and 18b. As a result, chains 22a and 22b are drawn and gears 23a and 23b are rotated by engaging each other. Accordingly, the second table 19 is raised or lowered horizontally.

In the embodiment described above, because the first table 10 can be replaced by the second table 19 when a process board is processed on the first table 10, the next process board can be positioned on the second table 19. After processing of the process board on the first table 10 has been terminated, the first and second tables 10 and 19 move in opposite directions; the second table 19 is raised to the same height as the first table 10 when in its original position by the cylinders 31. Then, the treated process board is removed from the first table 10 and the next process board can be positioned on the first table 10 while the next process board on the second table 19 is processed.

As a result, the time needed for positioning and removing a process board on the first and second tables 10 and 19 is reduced and the overall process is more efficient.

Figure 7:
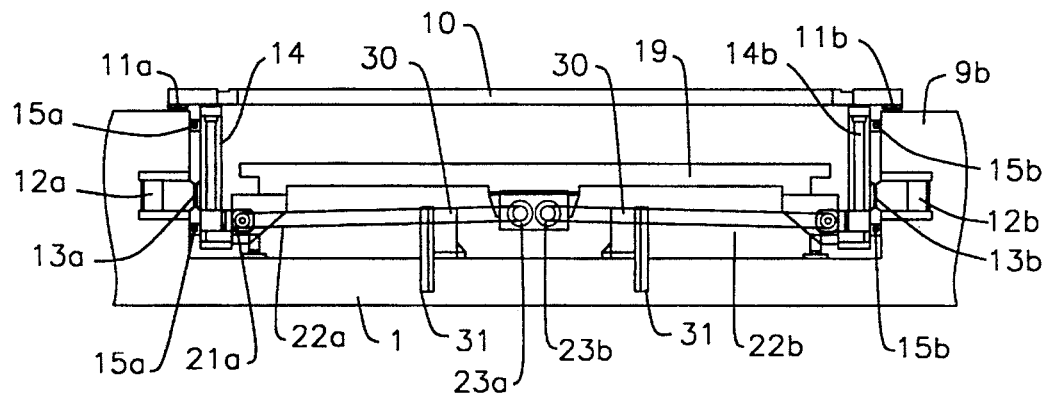
FIG. 7 shows a side-sectional view of the first and second tables of another embodiment according to the present invention.
Figure 8:
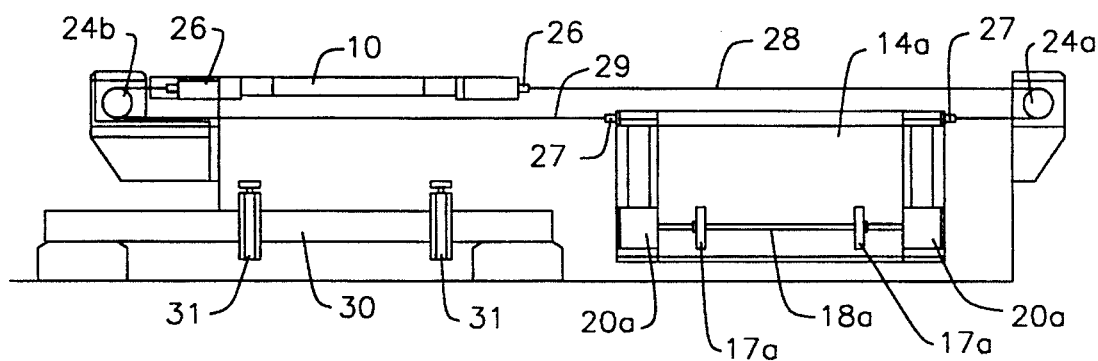
FIG. 8 is a side-sectional view of the embodiment of the invention shown in FIG. 7.

Referring to FIGS. 7 and 8, there is shown another embodiment of the invention wherein 10 designates a first table, 19 a second table; 11a, 11b, 15a and 15b designate rollers; 14a and 14b table supporting members; 17a and 17b gears; 18a and 18b rotary shafts; 20a and 20b bearings; 21a and 21b gears; 22a and 22b chains; 23a and 23b gears; 24a, 24b, 25a and 25b chain supporting gears; 26 and 27 chain fixing members; 28 and 29 chains; 30 cylinder frames; and 31 a raising and lowering cylinder, as previously described with respect to the embodiments of FIGS. 1–6.

In the present embodiment, the chain supporting gears 24b and 25b are fixed to the rotary shafts of servomotors 32 and the chains 29 are moved by the servomotors 32. Also, guides 33a and 33b are provided with the table frames 9a and 9b and guide driving members 34a and 34b are attached to the table supporting members 14a and 14b. As a result the first and second tables 10 and 19 are replaced by the servomotors 32.

As stated above, in the table replacement apparatus in a numerical control router according to the present invention, because the first and second tables can be replaced by each other, the next process board is positioned on the second table while the process board on the first table is processed. Also, after processing of the process board on the first table is terminated, the second table is moved below the original position of the first table and the first table is moved to the original position of the second table. Then the second table is raised to the height of the first table by the raising and lowering cylinders. The treated process board is then removed from the first table and the next process board is positioned on the first table. Therefore, the time needed for positioning and removing the process boards is reduced and the process conducted in a more efficient manner.

What is claimed is:

1. A table replacement apparatus in a numerical control router comprising at least one head structure having a main motor with a rotary shaft for fixing a tool of a drill or cutter, the at least one head structure being moved on head rails attached to a side of a rail member provided with an upper part of a bed, a first table movably mounted on table frames, two table supporting members movably supported by respective insides of the table frames, a second table supported on the sides of the table supporting members and adapted to be raised and lowered, chains respectively connected to the ends of the first and second tables, chain supporting gears for supporting the chains which are provided at the ends of the table frames, table moving means for moving the first and second tables in opposite directions, and cylinders for raising and lowering the second table, whereby the second table is movable into the original position of the first table, when processing of a process board on the first table is completed.

2. The table replacement apparatus of claim 1 wherein the table moving means is operatively connected to the table frames.

3. The table replacement apparatus of claim 2 wherein the table moving means comprises servomotors for moving the chains connected to the first and second tables.

\* \* \* \* \*